US009430657B2

(12) United States Patent
Chia et al.

(10) Patent No.: US 9,430,657 B2
(45) Date of Patent: Aug. 30, 2016

(54) DATA ENCRYPTION SYSTEM AND METHOD

(71) Applicant: National Cheng Kung University, Tainan (TW)

(72) Inventors: Chung-Chu Chia, Tainan (TW); Chung-Ping Young, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 89 days.

(21) Appl. No.: 14/026,346

(22) Filed: Sep. 13, 2013

(65) Prior Publication Data
US 2014/0258731 A1    Sep. 11, 2014

(30) Foreign Application Priority Data

Mar. 7, 2013   (TW) .............................. 102108116 A

(51) Int. Cl.
G06F 21/00 (2013.01)
G06F 21/60 (2013.01)

(52) U.S. Cl.
CPC .................................. *G06F 21/602* (2013.01)

(58) Field of Classification Search
None
See application file for complete search history.

(56) References Cited

U.S. PATENT DOCUMENTS

| 6,490,353 | B1* | 12/2002 | Tan ................................. 380/37 |
| 2003/0046564 | A1* | 3/2003 | Masuda et al. ............... 713/193 |
| 2006/0031674 | A1* | 2/2006 | Sakurai ......................... 713/166 |
| 2007/0255941 | A1* | 11/2007 | Ellis ............................... 713/151 |
| 2011/0096923 | A1* | 4/2011 | Rollgen .......................... 380/28 |
| 2013/0166080 | A1* | 6/2013 | Furuta et al. ................. 700/286 |

FOREIGN PATENT DOCUMENTS

| CN | 102255725 A | 11/2011 |
| TW | 200531494 A | 9/2005 |
| TW | 201117042 A | 5/2011 |

OTHER PUBLICATIONS

Chung-Chu Chia, "Randomly Configured and Pipeline Scheduled Multi-Cipher Cryptosystem for Modern Secure Protocols", National Cheng Kung University, Electronic Theses & Dissertations Service, pp. 1-8, Sep. 15, 2012.

* cited by examiner

*Primary Examiner* — David Le
(74) *Attorney, Agent, or Firm* — Muncy, Geissler, Olds & Lowe, P.C.

(57) ABSTRACT

A data encryption method is implemented by a data encryption system including a processing unit and a plurality of operating units which are electrically connected to the processing unit. Each operating unit includes an encryption element and a memory element storing a plurality of encryption programs. Each encryption program has a different combination of encryption algorithm and encryption mode. The data encryption method includes steps of: selecting one of the encryption programs randomly by each encryption element; receiving, by each encryption element, one of a plurality of keys randomly generated; inputting an unencrypted data; dividing the unencrypted data into a plurality of unencrypted data blocks by the processing unit; and encrypting the unencrypted data blocks according to the selected encryption programs and received keys by the encryption elements, respectively, to generate an encrypted data. A data encryption system is also disclosed.

12 Claims, 4 Drawing Sheets

DATA ENCRYPTION SYSTEM AND METHOD

CROSS REFERENCE TO RELATED APPLICATIONS

This Non-provisional application claims priority under 35 U.S.C. §119(a) on Patent Application No(s). 102108116 filed in Taiwan, Republic of China on Mar. 7, 2013, the entire contents of which are hereby incorporated by reference.

BACKGROUND OF THE INVENTION

1. Field of Invention

The invention relates to a data encryption system and method.

2. Related Art

Because the network technology is developed vigorously, it has gradually taken the place of tangible interfaces to become the mainstream for various data transmissions. For example, e-mail replaces letters to become indispensable for the modern communication. However, no matter the private letters or national defense confidentiality, they all concern privacy or national security. Therefore, the secrecy and security during the data transmission is always a focal point in the field of information and communication. Hence, there is necessity of data encryption for preventing private secrets from being easily stolen or cracked.

Although the encryption technology has been developed for several decades, the current data encryption method mostly stay in the one-time communication stage, using a kind of encryption algorithm in cooperation with a kind of encryption mode and using a key to encrypt an unencrypted data. For this method, if the encrypted data is intercepted during the transmission and some of the encrypted data are cracked, the cracker can very easily crack the remaining data by the same logic. Or, if the key is stolen or leaks out, the encrypted data will be all cracked. In other words, against people with bad intention, the current encryption method can not provide sufficient protection.

Besides, the current encryption method is strengthened just by increasing the length of the key or the number of times of the encryption. However, this not only reduces the encryption efficiency, but is also unreliable when someone intentionally leaks or steals the secret.

Therefore, it is an important subject to provide a data encryption system and method that can increase the security and reliability of data transmission with higher encryption efficiency.

SUMMARY OF THE INVENTION

In view of the foregoing subject, an objective of the invention is to provide a data encryption system and method that can increase the security and reliability of data transmission with higher encryption efficiency.

To achieve the above objective, a data encryption method according to the invention is implemented by a data encryption system including a processing unit and a plurality of operating units electrically connected to the processing unit. Each of the operating units includes an encryption element and a memory element storing a plurality of encryption programs, and each of the encryption programs has a different combination of encryption algorithm and encryption mode. The data encryption method comprises steps of: selecting one of the encryption programs randomly by each of the encryption elements; receiving, by each of the encryption elements, one of a plurality of keys randomly generated; inputting an unencrypted data; dividing the unencrypted data into a plurality of unencrypted data blocks by the processing unit; and encrypting the unencrypted data blocks by the encryption elements respectively according to the selected encryption programs and received keys to generate an encrypted data.

In one embodiment, before the step of encrypting the unencrypted data blocks, the data encryption method further comprises steps of: computing the time required for each of the encryption elements encrypting the unencrypted data block according to the combination of the encryption algorithm and mode of the encryption program by the processing unit; and scheduling the processing sequence of the operating units according to the time required for each of the encryption elements encrypting the unencrypted data block by the processing unit.

In one embodiment, the processing unit gives higher priority to the encryption element requiring less time to implement the encryption when scheduling the processing sequence of the operating units.

In one embodiment, each of the operating units further includes a buffer element having a temporary storing time, and the processing unit schedules the processing sequence of the operating units according to the time required for the encryption element encrypting the unencrypted data block plus the temporary storing time.

In one embodiment, the operating units are electrically connected to at least a transmission unit which transmits the selected encryption programs and received keys to a decryption apparatus for decrypting the encrypted data.

In one embodiment, the operating units are electrically connected to at least a transmission unit which transmits the selected encryption programs and received keys and the processing sequence of the operating units to a decryption apparatus for decrypting the encrypted data.

In one embodiment, the encryption algorithms include data encryption standard (DES), 128 advanced encryption standard (128AES) or triple data encryption standard (3DES), and the encryption modes include output feedback (OFB) or electronic codebook (ECB).

In one embodiment, the unencrypted data blocks have the same or different sizes.

To achieve the above objective, a data encryption system according to the invention comprises a processing unit and a plurality of operating units electrically connected to the processing unit. Each of the operating units comprises a memory element and an encryption element. The memory element stores a plurality of encryption programs, each of which has it different combination of encryption program and mode. Each of the encryption elements randomly selects one of the encryption programs and receives one of a plurality of keys randomly generated, the processing unit receives an unencrypted data and divide the unencrypted data into a plurality of unencrypted data blocks, and the encryption elements respectively encrypt the unencrypted data blocks according to the selected encryption programs and received keys to generate an encrypted data.

In one embodiment, before the encrypted elements encrypt the unencrypted data blocks, the processing unit computes the time required for each of the encryption elements encrypting the unencrypted data block according to the combination of the encryption algorithm and mode of the encryption program, and schedules the processing sequence of the operating units according to the time required for each of the encryption elements encrypting the unencrypted data block.

In one embodiment, the processing unit gives higher priority to the encryption element requiring less time to implement the encryption when scheduling the processing sequence of the operating units.

In one embodiment, each of the operating units further includes a buffer element having a temporary storing time, and the processing unit schedules the processing sequence of the operating units according to the time required for the encryption element encrypting the unencrypted data block plus the temporary storing time.

In one embodiment, the data encryption system further comprises at least a transmission unit which is electrically connected to the operating units and transmits the selected encryption programs and received keys to a decryption apparatus for decrypting the encrypted data.

In one embodiment, the data encryption system further comprises at least a transmission unit which is electrically connected to the operating units and transmits the selected encryption programs and received keys and the processing sequence of the operating units to a decryption apparatus for decrypting the encrypted data.

In one embodiment, the encryption algorithms include data encryption standard (DES), 128 advanced encryption standard (128AES) or triple data encryption standard (3DES), and the encryption modes include output feedback (OFB) or electronic codebook (ECB).

In one embodiment, the unencrypted data blocks have the same or different sizes.

As mentioned above, in the data encryption system and method according to this invention, a plurality of operating units can generate unanticipated combinations of the encryption algorithm and mode through the random selection, and also the keys are randomly generated. Then, the unencrypted data is divided into a plurality of unencrypted data blocks, which are encrypted by different operating units. Thereby, even if the encrypted data is intercepted, it still can not be cracked by brute force cracking for example. Again, even if some of the encrypted data are cracked, the remaining portion of the encrypted data is hard to be cracked by the cracker in the same manner because the all unencrypted data blocks are applied with different combinations of the encryption algorithm and mode. Therefore, the security and reliability of the data transmission can be enhanced a lot. Accordingly, the invention also can be regarded as a kind of diverse random encryption system and method.

Furthermore, in the data encryption system and method according to this invention, the processing unit can schedule the processing sequence of the operating units so that the encryption can be more effective, and thus the time required for the total encryption can be decreased.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
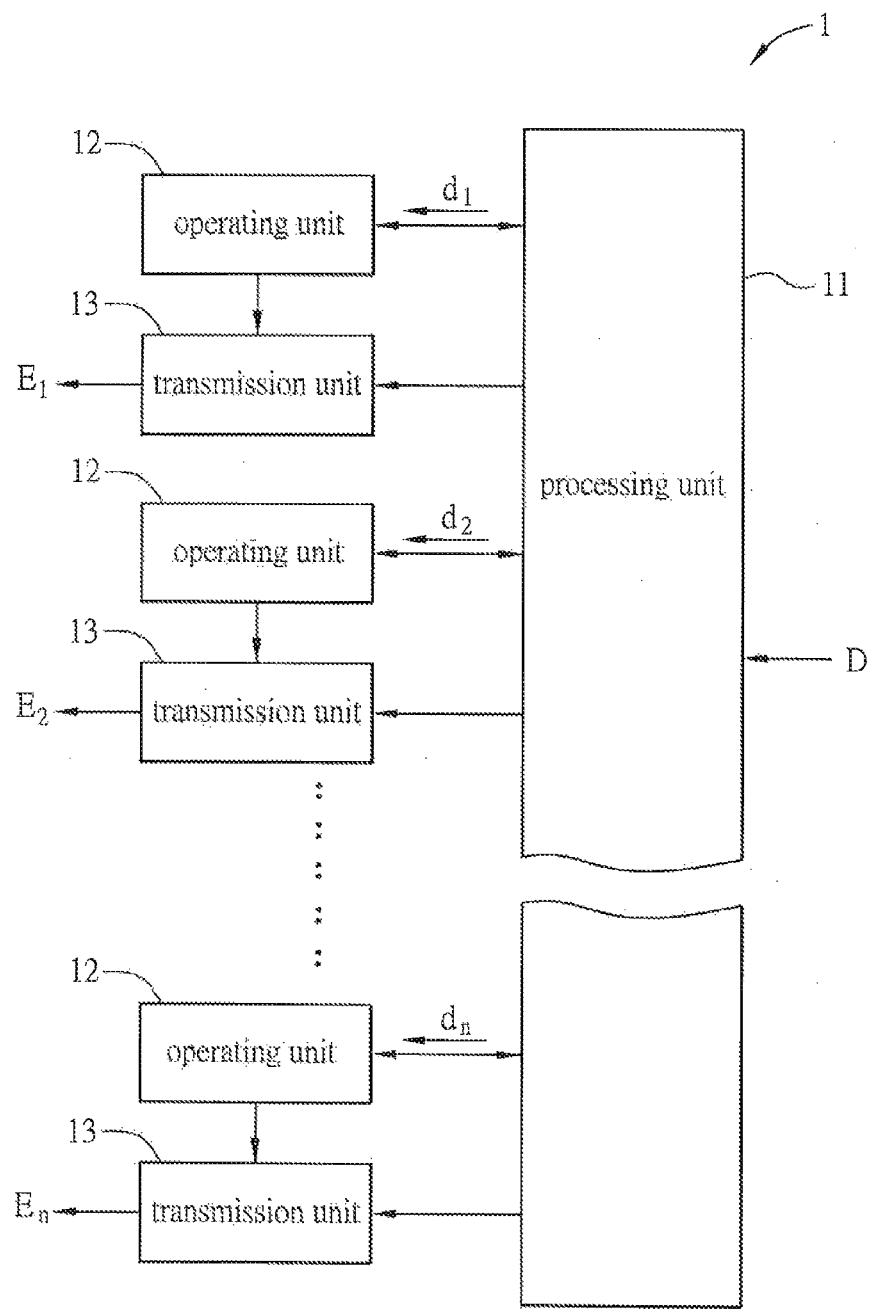
FIG. 1 is a block diagram of a data encryption system according to a preferred embodiment of the invention.
Figure 2A:
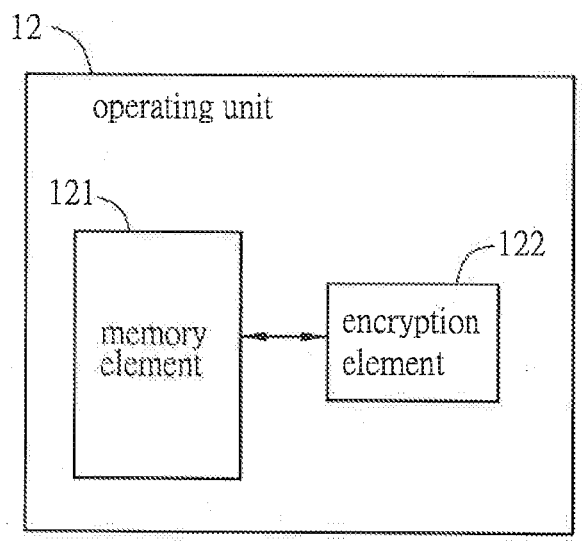
FIG. 2A is a block diagram of an operating unit in FIG. 1.

FIG. 1 is a block diagram of a data encryption system according to a preferred embodiment of the invention, and FIG. 2A is a block diagram of an operating unit in FIG. 1. The data encryption system of this invention can encrypt an unencrypted data, and the unencrypted data means the data waiting for encryption. In this embodiment, the data encryption system can be built in a computer. When the computer needs to transmit data through a network (e.g. Internet), the data encryption system can encrypt the data to be transmitted (as the unencrypted data), and then the encrypted data can be transmitted to a remote end. Thereby, the risk that the intercepted encrypted data is cracked can be decreased, and thus the security and reliability of the data transmission can be increased. To be noted, the data encryption system and method of this invention are constructed according to the symmetric encryption, which means the encryption and decryption use corresponding keys. Specifically, the key that the decryption apparatus uses to decrypt the encrypted data is the key that the data encryption system uses to encrypt the unencrypted data.

The unencrypted data mentioned in this invention can be of any format, and the encrypted data (i.e. the data that has been encrypted) also can be of any format. The key mentioned in this invention also can be called the secret key.

As shown in FIG. 1, the data encryption system 1 includes a processing unit 11 and a plurality of operating units 12.

The processing unit 11 can be implemented by a central processing unit (CPU) generally used in a computer, or by a specialized processor for servers, and anyhow it can have higher processing ability to sufficiently process a large number of data. When the data encryption system 1 receives an unencrypted data D, the processing unit 11 will divide the unencrypted data into a plurality of unencrypted data blocks $d_1 \sim d_n$ according to the determined data size of the data block, and transmit the unencrypted data blocks to the operating units 12 respectively. The unencrypted data blocks can have the same or different size. For example, each of the unencrypted data blocks can have 128 bytes, or some of the unencrypted data blocks have 192 bytes while the others have 128 bytes. However, the invention is not limited thereto, and the size can be determined according to the practical requirements.

The operating units 12 are electrically connected to the processing unit 11 for the mutual data transmission. As shown in FIG. 2A, each of the operating units 12 includes a memory element 121 and an encryption element 122.

The memory element 121 can be implemented by volatile memory or non-volatile memory. Specifically, the memory element 121 can be programmed read only memory (programmed ROM). The memory element 121 stores a plurality of encryption programs, and each of them has a different combination of an encryption algorithm and an encryption mode, and can be called a configuration therefore. For example, the encryption algorithms can include data encryption standard (DES), 128 advanced encryption standard (128AES), triple data encryption standard (3DES) or other encryption algorithms. Other encryption algorithms exemplarily include RCS, blowfish, or international data encryption algorithm (IDEA). The encryption modes include cipher-block chaining (CBC), propagating cipher-block chaining (PCBC), cipher feedback (CFB), output feedback (OFB), counter mode (CM), or electronic codebook (ECB), for example. The above-mentioned encryption algorithms and modes can be known by those skilled in the art, and therefore they are not described here for conciseness. To be noted, they are just for example but not for limiting the scope of the invention, and the currently known encryption algorithms and modes can be properly used in this invention.

An embodiment is illustrated as below for the further understanding. In this embodiment, the data encryption system uses three encryption algorithms (DES, 128AES and 3DES) and two encryption modes (OFB and ECB). So, each of the memory elements can store six encryption programs (also called six configurations), which are listed as the table 1.

TABLE 1

| number of encryption programs | Encryption algorithms | Encryption modes |
| --- | --- | --- |
| 0 | 128AES | ECB |
| 1 | 128AES | OFB |
| 2 | DES | ECB |
| 3 | DES | OFB |
| 4 | 3DES | ECB |
| 5 | 3DES | OFB |

The table 1 can be set as a look-up table and stored in the memory element 121 of each of the operating units 12. When the encryption element 122 implements the step of randomly selecting one of the encryption programs, the encryption element 122 can select the encryption program from the look-up table according to the number that is given by a random number generator (not shown) connected to the encryption element 122. On this principle, the encryption elements 122 may select different encryption programs, or partially select the same encryption program, or totally select the same encryption program.

Besides, the encryption element 122 receives one of the keys randomly generated. In detail, the encryption element 122 of each of the operating units 12 can be connected to a key generator (not shown), and receives different key generated by the key generator. The technical principle and related details of the key generator can be known by those skilled in the art, and therefore they are not described here for conciseness. Otherwise, the key also can be generated and used by each of the encryption elements 122.

In other embodiments, the encryption element 122 can receive the key and then randomly select the encryption program. In other words, selecting the encryption program and receiving the key are independent steps and can be exchanged in sequence.

For enhancing the encryption efficiency, a step of scheduling the operating units 12 can be implemented before the encryption elements 122 of the operating units 12 implement the encryptions. Therefore, the operating units 12 can individually implement their own encryptions at the proper times, and the operations of the operating units 12 can be automatically and rapidly switched to maximize the production of the encrypted data.

In detail, because the operation time of each of the encryption algorithms and modes can be estimated or obtained, the processing unit 11 can easily compute the time required for each of the encryption elements 122 to encrypt the unencrypted data block according to the combination of the encryption algorithm and mode, and thus schedules the processing sequence of the operating units 12. In other words, the processing unit 11 is able to schedule the processing sequence of the operating units 12, and preferably, gives the priority to the encryption element 122 requiring less time.

After the scheduling is completed, the processing unit 11 transmits a plurality of the unencrypted data blocks $d_1$~$d_n$ to the corresponding operating units 12 for the encryption. When the all operating units 12 complete their operations, the unencrypted data D is encrypted completely to become the encrypted data (composed of the encrypted data blocks $E_1$~$E_n$). If the number of the unencrypted data blocks $d_1$~$d_n$ is larger than that of the operating units 12, some operating units 12 can be repeatedly used to complete the total encryption. To be noted, the operating units 12 can be repeatedly used in a circular or random manner.

Figure 2B:
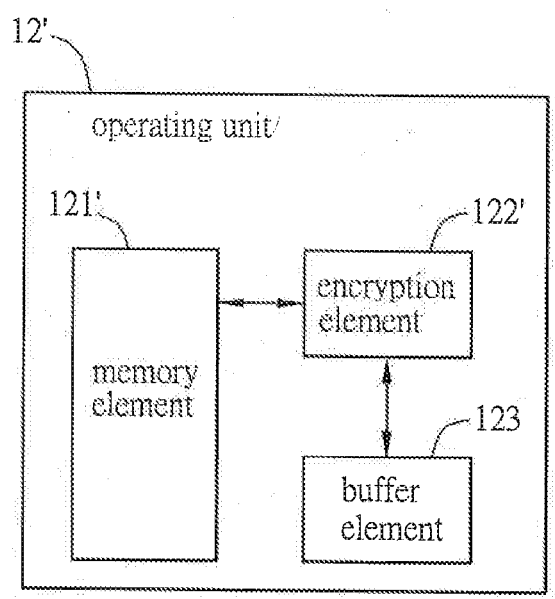
FIG. 2B is a block diagram of another operating unit according to this invention.

FIG. 2B is a block diagram of another operating unit according to this invention. As shown in FIG. 2B, the operating unit 12' can further include a buffer element 123, which is used to temporarily store the inputted and divided unencrypted data block (referring to FIG. 1) so that the encryption element 122' can catch it during the operation. In this embodiment, because the buffer element 123 has a temporary storing time, the processing unit 11 schedules the processing sequence of the operating units 12' according to the time required for the encryption algorithm and mode plus the temporary storing time.

As shown in FIG. 1, the data encryption system 1 can further include at least a transmission unit 13. In this embodiment, the number of the transmission units 13 is equal to that of the operating units 12, and the operating units 12 are electrically connected to the transmission units 13, respectively. When the operating unit 12 completes the encryption of the unencrypted data block, the encrypted data block can be transmitted to a remote end through the transmission unit 13. Practically, the transmission units 13 can first transmit the encrypted data block having priority (i.e. the unencrypted data block that is first encrypted) according to the scheduling sequence of the operating units 12. More specifically, the transmission units 13 can be controlled by the processing unit 11, and transmit the encrypted data blocks according to the command of the processing unit 11 that is given according to the scheduling sequence of the operating units 13 for achieving the most effective encryption and transmission. In other embodiments, the transmission units can be controlled by the operating units instead of the processing unit. However, the invention is not limited thereto.

To be noted, the above-mentioned embodiments are preferable ones but not for limiting the scope of this invention. For example, when the encryption efficiency is not considered with high priority, the operating unit requiring more time can be given higher priority to implement the encryption or transmission. The scheduling also can be implemented according to other conditions or parameters. Otherwise, the scheduling can be omitted.

To be noted, the transmission units 13 not only transmit the encrypted data blocks $E_1$~$E_n$ to a data decryption apparatus of a remote receiver (not shown). Furthermore, the transmission units 13 also needs to transmit the encryption programs and keys used by the operating units 12 to the data decryption apparatus so that the data decryption apparatus can decrypt the encrypted data, because the data encryption system uses the symmetric encryption. In addition, the transmission units 13 also transmit the processing sequence of the operating units 12 to the data decryption apparatus, preferably, to allow the decryption apparatus to decrypt the encrypted data. As understood by those skilled in the art, the decryption applies the same principle but with the reverse steps, and therefore the system architecture thereof is similar to the data encryption system. Hence, from the foregoing illustration, a data decryption system and method of this invention can be understood by those skilled in the art, and therefore they are not described here for conciseness.

On the whole, during a communication stage, the data encryption system of this invention has two random procedures to randomly generate the key and to randomly select the encryption program. Besides, the combinations (configurations) of the encryption algorithm and mode of the all encryption programs may be different and also can not be anticipated. Therefore, even if the encrypted data is intercepted during the data transmission, it won't be easily cracked. Even if some of the encrypted data are cracked, the remaining portion of the encrypted data is hard to be cracked by the cracker in the same manner because the all unencrypted data blocks can be applied with different combinations of the encryption algorithm and mode.

The invention can be implemented before the communication or transmission stage. Besides, by using the random manner, the security and reliability of the data encryption system and method are enhanced a lot. But as for the prior art, a single encryption mode and a single key are used in every communication procedure for a general information security protocol, and therefore the disconnection and reconnection need to be repeatedly conducted in order to prevent the encryption means from being stolen. However, for the unencrypted data in the invention, the encryption, transmission and decryption can be completed in the one-time communication procedure. Otherwise, in the invention, the unencrypted data blocks can be encrypted, transmitted and then decrypted in batches or in a plurality of communication procedures.

Figure 3:
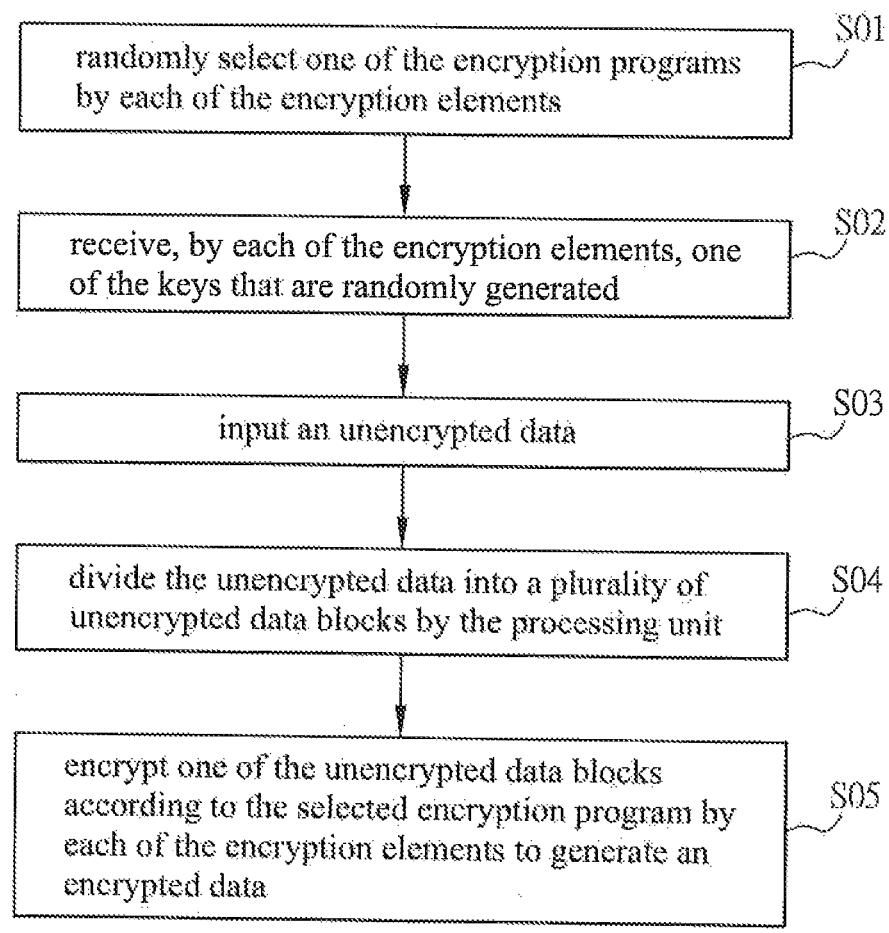
FIG. 3 is a flow chart of a data encryption method according to a preferred embodiment of the invention.

FIG. 3 is a flow chart of a data encryption method according to a preferred embodiment of the invention. The data encryption method is in cooperation with the data encryption system 1 as shown in FIGS. 1 and 2A, and includes the steps S01 to S05.

The step S01 is to randomly select one of the encryption programs by each of the encryption elements 122. The step S02 is to receive, by each of the encryption elements 122, one of the keys that are randomly generated. The step S03 is to input an unencrypted data D. The step S04 is to divide the unencrypted data D into a plurality of unencrypted data blocks $d_1 \sim d_n$ by the processing unit 11. The step S05 is to encrypt one of the unencrypted data blocks $d_1 \sim d_n$ according to the selected encryption program by each of the encryption elements 122 to generate an encrypted data (composed of the encrypted data blocks $E_1 \sim E_n$).

Figure 4:
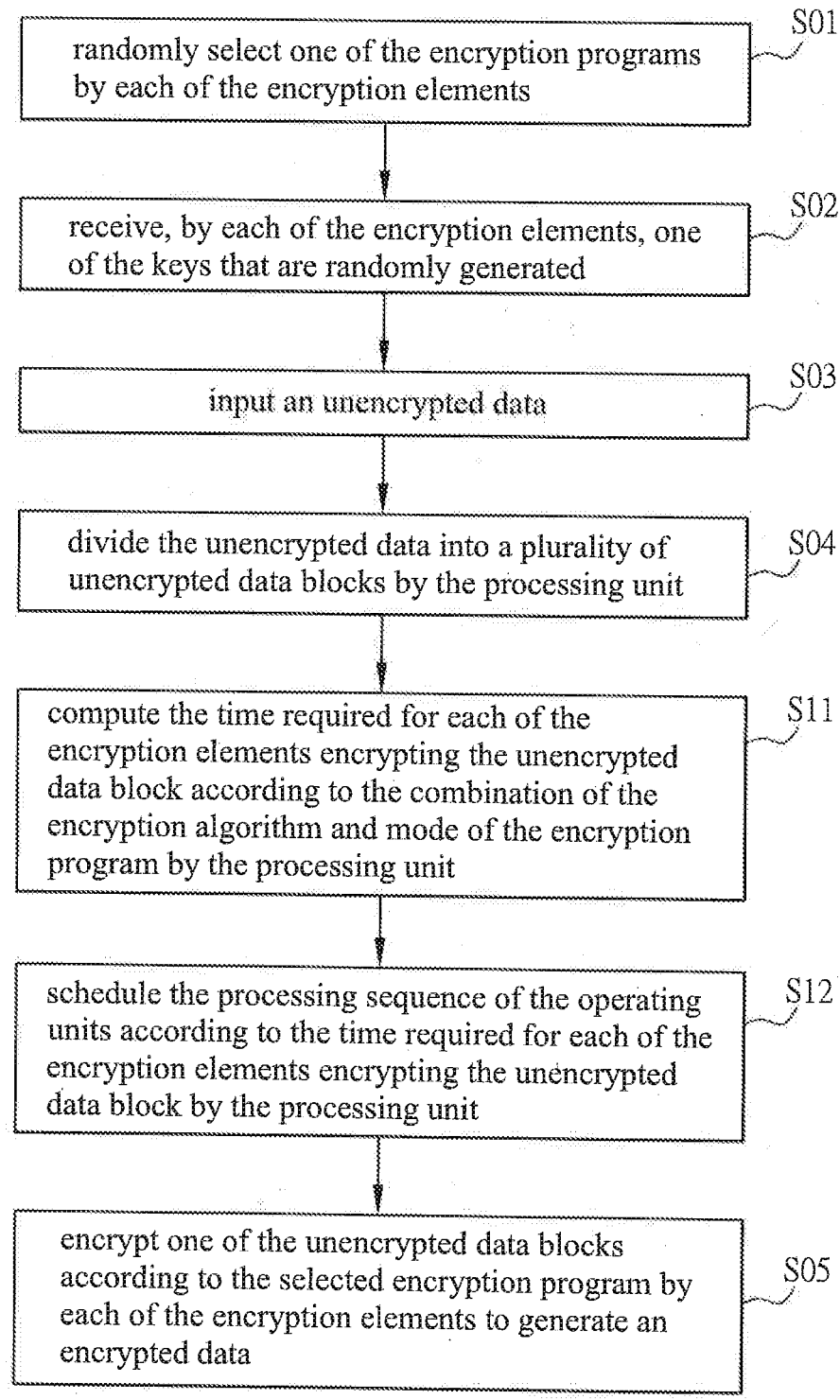
FIG. 4 is a flow chart of a data encryption method according to another preferred embodiment of the invention.

FIG. 4 is a flow chart of a data encryption method according to another preferred embodiment of the invention. In this embodiment, the data encryption method can further include the steps S11 and S12 before the step S05. The step S11 is to compute the time required for each of the encryption elements 122 encrypting the unencrypted data block according to the combination of the encryption algorithm and mode of the encryption program by the processing unit 11. The step S12 is to schedule the processing sequence of the operating units 12 according to the time required for each of the encryption elements 122 encrypting the unencrypted data block by the processing unit 11.

The technical features and details of the above-mentioned data encryption method are substantially the same as the data encryption system 1, and therefore they are not described here for conciseness. Besides, similarly, a corresponding data decryption method can be known unambiguously by those skilled in the art from the disclosed content of the invention.

In summary, in the data encryption system and method according to this invention, a plurality of operating units can generate unanticipated combinations of the encryption algorithm and mode through the random selection, and also the keys are randomly generated. Then, the unencrypted data is divided into a plurality of unencrypted data blocks, which are encrypted by different operating units. Thereby, even if the encrypted data is intercepted, it still can not be cracked by brute force cracking for example. Again, even if some of the encrypted data are cracked, the remaining portion of the encrypted data is hard to be cracked by the cracker in the same manner because the all unencrypted data blocks are applied with different combinations of the encryption algorithm and mode. Therefore, the security and reliability of the data transmission can be enhanced a lot. Accordingly, the invention also can be regarded as a kind of diverse random encryption system and method.

Furthermore, in the data encryption system and method according to this invention, the processing unit can schedule the processing sequence of the operating units so that the encryption can be more effective, and thus the time required for the total encryption can be decreased.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A data encryption method implemented by a data encryption system including a processing unit and a plurality of operating units electrically connected to the processing unit, wherein each of the operating units includes an encryption element and a memory element storing a plurality of encryption programs, and each of the encryption programs has a different combination of encryption algorithm and encryption mode, the data encryption method comprising steps of:

selecting one of the encryption programs randomly by each of the encryption elements;

receiving, by each of the encryption elements, one of a plurality of keys randomly generated;

inputting an unencrypted data;

dividing the unencrypted data into a plurality of unencrypted data blocks by the processing unit; and encrypting the unencrypted data blocks by the encryption elements respectively according to the selected encryption programs and received keys to generate an encrypted data, wherein before the step of encrypting the unencrypted data blocks, further comprising steps of:

computing the time required for each of the encryption elements encrypting the unencrypted data block according to the combination of the encryption algorithm and mode of the encryption program by the processing unit; and scheduling the processing sequence of the operating units according to the time required for each of the encryption elements encrypting the unencrypted data block by the processing unit,
wherein the processing unit gives higher priority to the encryption element requiring less time to implement the encryption when scheduling the processing sequence of the operating units.

2. The data encryption method as recited in claim 1, wherein each of the operating units further includes a buffer element having a temporary storing time, and the processing unit schedules the processing sequence of the operating units according to the time required for the encryption element encrypting the unencrypted data block plus the temporary storing time.

3. The data encryption method as recited in claim 1, wherein the operating units are electrically connected to at least a transmission unit which transmits the selected encryption programs and received keys to a decryption apparatus for decrypting the encrypted data.

4. The data encryption method as recited in claim 1, wherein the operating units are electrically connected to at least a transmission unit which transmits the selected encryption programs and received keys and the processing sequence of the operating units to a decryption apparatus for decrypting the encrypted data.

5. The data encryption method as recited in claim 1, wherein the encryption algorithms include data encryption standard (DES), 128 advanced encryption standard (128AES) or triple data encryption standard (3DES), and the encryption modes include output feedback (OFB) or electronic codebook (ECB).

6. A data encryption system, comprising:
a processing unit; and
a plurality of operating units electrically connected to the processing unit, each of the operating units comprising:
a memory element storing a plurality of encryption programs, each of which has a different combination of encryption program and mode; and
an encryption element, wherein each of the encryption elements randomly selects one of the encryption programs and receives one of a plurality of keys randomly generated, the processing unit receives an unencrypted data and divide the unencrypted data into a plurality of unencrypted data blocks, and the encryption elements respectively encrypt the unencrypted data blocks according to the selected encryption programs and received keys to generate an encrypted data, wherein before the encrypted elements encrypt the unencrypted data blocks, the processing unit computes the time required for each of the encryption elements encrypting the unencrypted data block according to the combination of the encryption algorithm and mode of the encryption program, and schedules the processing sequence of the operating units according to the time required for each of the encryption elements encrypting the unencrypted data block,
wherein the processing unit gives higher priority to the encryption element requiring less time to implement the encryption when scheduling the processing sequence of the operating units.

7. The data encryption system as recited in claim 6, wherein each of the operating units further includes a buffer element having a temporary storing time, and the processing unit schedules the processing sequence of the operating units according to the time required for the encryption element encrypting the unencrypted data block plus the temporary storing time.

8. The data encryption system as recited in claim 6, further comprising:
at least a transmission unit electrically connected to the operating units, and transmitting the selected encryption programs and received keys to a decryption apparatus for decrypting the encrypted data.

9. The data encryption system as recited in claim 6, further comprising:
at least a transmission unit electrically connected to the operating units, and transmitting the selected encryption programs and received keys and the processing sequence of the operating units to a decryption apparatus for decrypting the encrypted data.

10. The data encryption system as recited in claim 6, wherein the encryption algorithms include data encryption standard (DES), 128 advanced encryption standard (128AES) or triple data encryption standard (3DES), and the encryption modes include output feedback (OFB) or electronic codebook (ECB).

11. The data encryption method as recited in claim 1, wherein the unencrypted data blocks have the same or different sizes.

12. The data encryption system as recited in claim 6, wherein the unencrypted data blocks have the same or different sizes.

* * * * *